United States Patent
Wu et al.

(10) Patent No.: US 11,358,812 B2
(45) Date of Patent: Jun. 14, 2022

(54) METHOD AND APPARATUS FOR CONTROLLING ARTICLE DELIVERY DEVICE, AND REFRIGERATOR

(71) Applicants: Qingdao Haigao Design & Manufacturing Co., Ltd., Shandong (CN); Haier Smart Home Co., Ltd., Shandong (CN)

(72) Inventors: Jian Wu, Shandong (CN); Haibo Liu, Shandong (CN); Shu Zhou, Shandong (CN); Zhiqun Feng, Shandong (CN); Zhaojun Fei, Shandong (CN)

(73) Assignees: QINGDAO HAIGAO DESIGN & MANUFACTURING CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 0 days.

(21) Appl. No.: 17/326,380

(22) Filed: May 21, 2021

(65) Prior Publication Data
US 2021/0292109 A1 Sep. 23, 2021

Related U.S. Application Data

(63) Continuation of application No. PCT/CN2020/126870, filed on Nov. 5, 2020.

(30) Foreign Application Priority Data

Dec. 31, 2019 (CN) .......................... 201911409935.4

(51) Int. Cl.
*B65G 65/00* (2006.01)
*B65B 57/20* (2006.01)
*F25D 23/00* (2006.01)

(52) U.S. Cl.
CPC ............ *B65G 65/005* (2013.01); *B65B 57/20* (2013.01); *F25D 23/00* (2013.01); *F25D 2500/06* (2013.01)

(58) Field of Classification Search
CPC .................................................... B65G 65/005
See application file for complete search history.

(56) References Cited

U.S. PATENT DOCUMENTS

| | | | |
|---|---|---|---|
| 3,866,780 A * | 2/1975 | Miller ..................... | B66F 9/183 414/623 |
| 9,250,003 B2 * | 2/2016 | Kim ........................ | F25D 11/00 |
| 9,440,550 B2 * | 9/2016 | Jones ...................... | G06Q 10/06 |

FOREIGN PATENT DOCUMENTS

| CN | 204129531 | 1/2015 |
|---|---|---|
| CN | 107103391 | 8/2017 |

(Continued)

OTHER PUBLICATIONS

International Search Report from PCT/CN2020/126870 dated Feb. 8, 2021.

*Primary Examiner* — Saul Rodriguez
*Assistant Examiner* — Willie Berry, Jr.
(74) *Attorney, Agent, or Firm* — Calfee, Halter & Griswold LLP

(57) ABSTRACT

The present disclosure relates to the technical field of intelligent household appliances, and more particularly, to a method for controlling an article delivery device, the method including: detecting whether an article delivery device is in a wireless charging area, and charging the article delivery device according to a battery power of the article delivery device, controlling the article delivery device to be loaded according to a received user instruction and a target position after the battery power of the article delivery device reaches (Continued)

a set threshold value, and controlling the article delivery device to move to the target position after the article delivery device is loaded.

19 Claims, 7 Drawing Sheets

(56) References Cited

FOREIGN PATENT DOCUMENTS

| | | |
|---|---|---|
| CN | 107784470 | 3/2018 |
| CN | 108032315 | 5/2018 |
| CN | 108327556 | 7/2018 |
| CN | 207986140 | 10/2018 |
| CN | 110329774 | 10/2019 |
| JP | 5688252 | 3/2015 |
| WO | 2019177552 | 9/2019 |

\* cited by examiner

METHOD AND APPARATUS FOR CONTROLLING ARTICLE DELIVERY DEVICE, AND REFRIGERATOR

CROSS-REFERENCE TO RELATED APPLICATIONS

The present application is a bypass continuation of the PCT Application No. PCT/CN2020/126870, filed on Nov. 5, 2020, which claims the priority to Chinese Patent Application No. 201911409935.4, filed on Dec. 31, 2019, which are incorporated herein by reference in their entirety.

TECHNICAL FIELD

The present disclosure relates to the technical field of intelligent household appliances, and more particularly, to a method and an apparatus for controlling an article delivery device, and a refrigerator.

BACKGROUND

With the rapid development of IoT technologies, intelligent household appliances have played an important role in family informatization and social informatization, and an increasing number of conventional household appliances have joined them, whereby the intelligent control of household appliances and other intelligent scenarios are enabled through the IoT technologies. A refrigerator is a common household electric appliance, typically a user has to approach his/her refrigerator to fetch a drink or food, but a user with mobility issues may be troubled with this scenario, or a user feels too lazy to approach his/her refrigerator when he/she is tired and wishes if he/she might access the drink or food in the refrigerator anytime and anywhere.

In the implementation of embodiments of the present disclosure, it has been found that the prior art is defective at least in that: although the refrigerator is provided with an article delivery device, the article delivery device may be troubled with battery power issues, for example, if not powered by a reliable source, the article delivery device may stop suddenly in the moving process, leading to a poor user experience.

SUMMARY

A summary is provided to facilitate a basic understanding of some aspects of the disclosed embodiments. The summary is not a general overview, nor is it intended to identify key/critical elements or to define the scope of the embodiments, but rather as a prelude to the detailed description that follows.

Embodiments of the present disclosure provide a method and an apparatus for controlling an article delivery device, and a refrigerator to solve the technical problem of how to power the article delivery device sufficiently to complete the transfer in a wireless charging mode.

In some embodiments, the method for controlling the article delivery device includes:

detecting whether an article delivery device is in a wireless charging area, and charging the article delivery device according to a battery power of the article delivery device;

controlling the article delivery device to be loaded according to a received user instruction and a target position after the battery power of the article delivery device reaches a set threshold value; and controlling the article delivery device to move to the target position after the article delivery device is loaded.

In some embodiments, the apparatus for controlling the article delivery device includes a processor and a memory storing program instructions, and the processor is configured to perform the above-described method for controlling the article delivery device when executing the program instructions.

In some embodiments, the refrigerator includes the apparatus for controlling the article delivery device as described above.

The method and the apparatus for controlling the article delivery device, and the refrigerator provided by the embodiments of the present disclosure are advantageous in that the article delivery device can be powered sufficiently in a wireless charging mode to move to the target position, which ensures a complete and normal delivery and avoids a situation where the article delivery device cannot reach the target position or cannot return to a starting position due to low power, thereby improving the user experience.

The foregoing summary and the following description are exemplary and explanatory only and are not limiting the invention.

BRIEF DESCRIPTION OF THE DRAWINGS

One or more embodiments are exemplified in the accompanying drawings, and such examples and drawings do not define the scope of the embodiments; like reference signs denote like elements throughout the drawings, and the drawings are not to scale, where.

DETAILED DESCRIPTION

A detailed description of the implementation of the embodiments of the disclosure will be provided with reference to the accompanying drawings to facilitate a fuller and clearer understanding of features and technical aspects of the embodiments of the disclosure, and the drawings are included by way of illustration only and are not intended to limit the embodiments of the disclosure. In the following technical description, for an illustrative purpose, a plenty of details are set forth to provide a thorough understanding of the disclosed embodiments. However, one or more embodiments may be practiced without these such details. In other instances, well-known structures and devices may be simplified for the brevity of the drawings.

Figure 1:
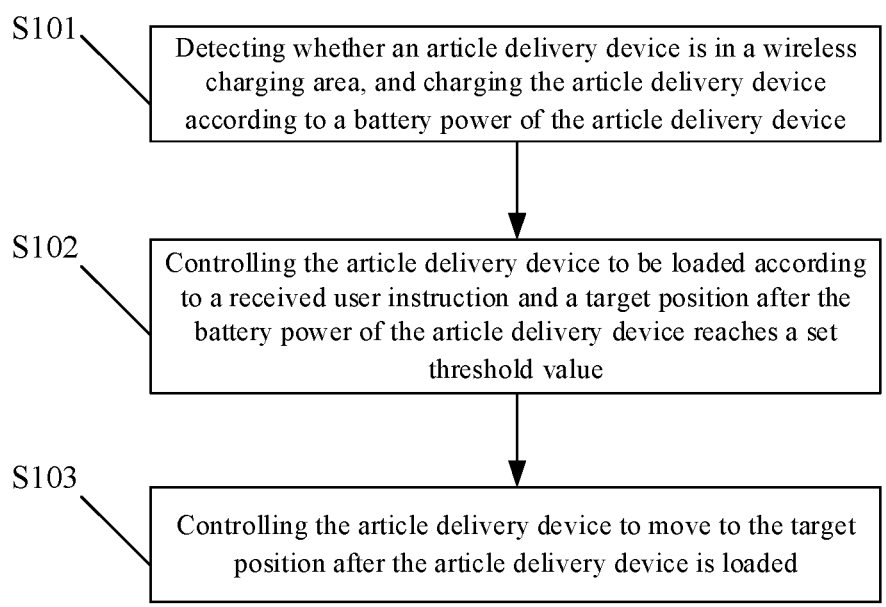
FIG. 1 is a flowchart of a method for controlling an article delivery device provided by an embodiment of the present disclosure.

An embodiment of the present disclosure provides a method for controlling an article delivery device, as shown in FIG. 1, including:

step S101, detecting whether the article delivery device is in a wireless charging area, and charging the article delivery device according to a battery power of the article delivery device;

step S102, controlling the article delivery device to be loaded according to a received user instruction and a target position after the battery power of the article delivery device reaches a set threshold value; and step S103, controlling the article delivery device to move to the target position after the article delivery device is loaded.

In some embodiments, the refrigerator is provided with the article delivery device, the article delivery device and a body of the refrigerator form an intelligent refrigerator, and the refrigerator powers the article delivery device; optionally, the article delivery device is charged wirelessly 'by the refrigerator; the article delivery device and the refrigerator perform data interaction wirelessly through a wireless communication module. The article delivery device can move to a user according to a user instruction.

In some embodiments, the target position is a location of the user, although the target position may be set coordinates. Alternatively, the location of the user is a location of a user terminal sending the user instruction.

In some embodiments, if the article delivery device is detected to be in the wireless charging area, the article delivery device may not be charged if the battery power of the article delivery device is greater than or equal to 80%; the article delivery device is charged if the battery power of the article delivery device is less than 80%.

In some embodiments, the threshold of battery power is set to be 40%, and when the battery power of the article delivery device reaches 40%, the article delivery device can be controlled to be loaded according to the user instructions and the target position and move to the target position after it is loaded. When the battery power of the article delivery device is less than 40%, the article delivery device will not be loaded, not to mention to move to the target position. The detection of the battery power ensures that the article delivery device has enough battery power to move to the target position and return to a starting position.

In some embodiments, controlling the article delivery device to be loaded includes: controlling the article delivery device to open according to the user instruction, and controlling the article delivery device to close after detecting that an article enters the article delivery device.

Optionally, an article exit device is controlled to move the article to a transfer device according to user instructions, and the transfer device is controlled to move the article to the article delivery device.

In some embodiments, the method for controlling the article delivery device further includes: controlling the article delivery device to open when the article delivery device reaches the target position.

In some embodiments, the method for controlling the article delivery device further includes: controlling the article delivery device to close after detecting that the article leaves the article delivery device.

In some embodiments, after detecting that the article leaves the article delivery device and controlling the article delivery device to close, the method further includes: controlling the article delivery device to return to a starting position, so that the battery power consumption of the article delivery device can be saved.

Optionally, after the article delivery device reaches the target position, the article delivery device is controlled to close in a set time and to return to the starting position, so that the battery power consumption of the article delivery device can be saved.

In some embodiments, the target position is obtained by calculating a location beacon address broadcast by a location beacon and a received signal strength indication (RSSI).

In some embodiments, the location beacon is a Bluetooth Beacon.

In some embodiments, controlling the article delivery device to open includes: lifting the loading chamber of the article delivery device to open the article delivery device.

In some embodiments, controlling the article delivery device to close includes: lowering the loading chamber of the article delivery device to close the article delivery device.

Figure 2:
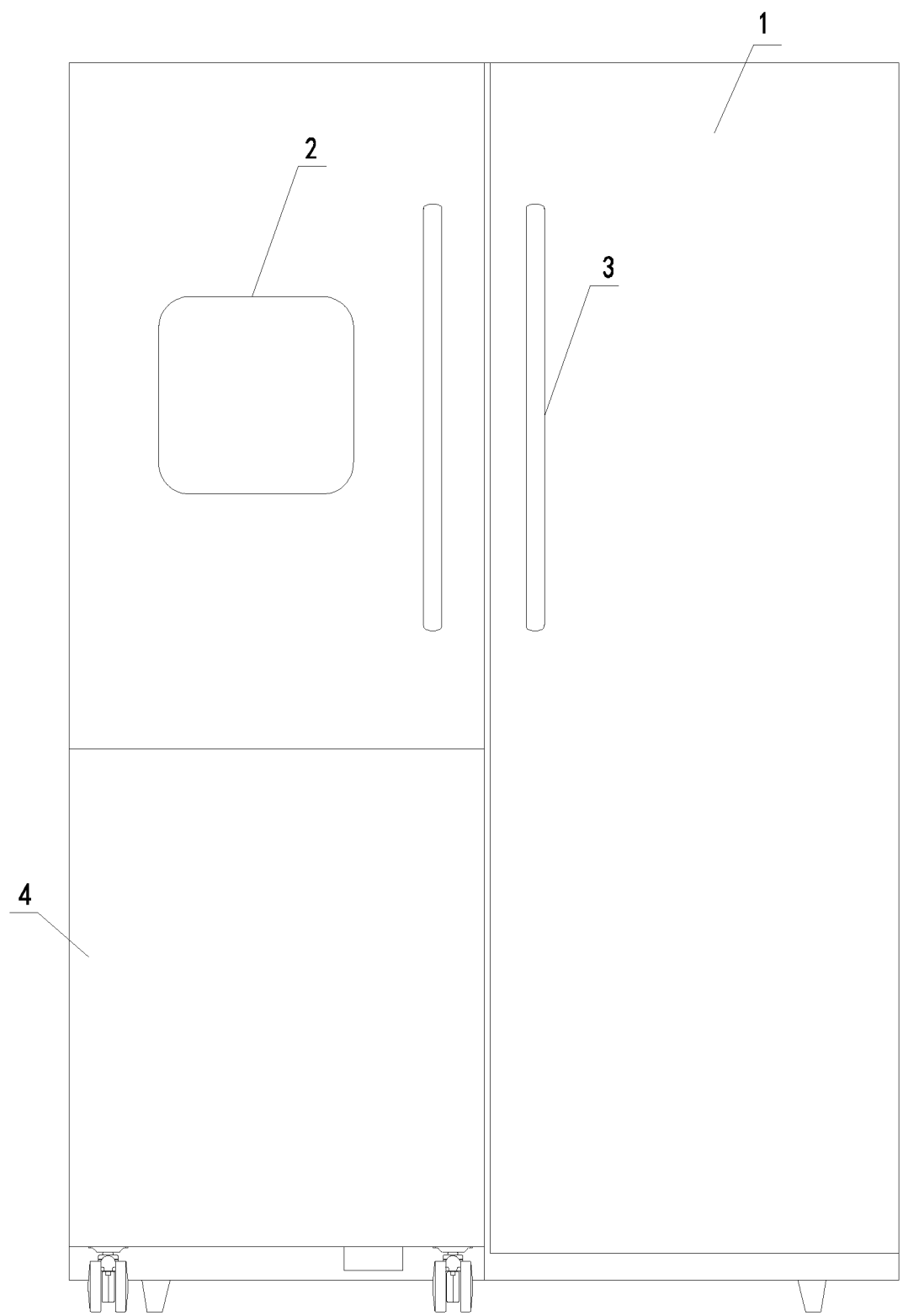
FIG. 2 is a schematic diagram of an assembly of a refrigerator and the article delivery device provided by an embodiment of the present disclosure.

In practical application, the article delivery device is optionally disposed at the bottom of the refrigerator, as shown in FIG. 2, which is a schematic diagram of an assembly of the refrigerator and the article delivery device, including the article delivery device 4, the refrigerator 1, a screen of the refrigerator 2, and a handle of the refrigerator 3.

Figure 3:
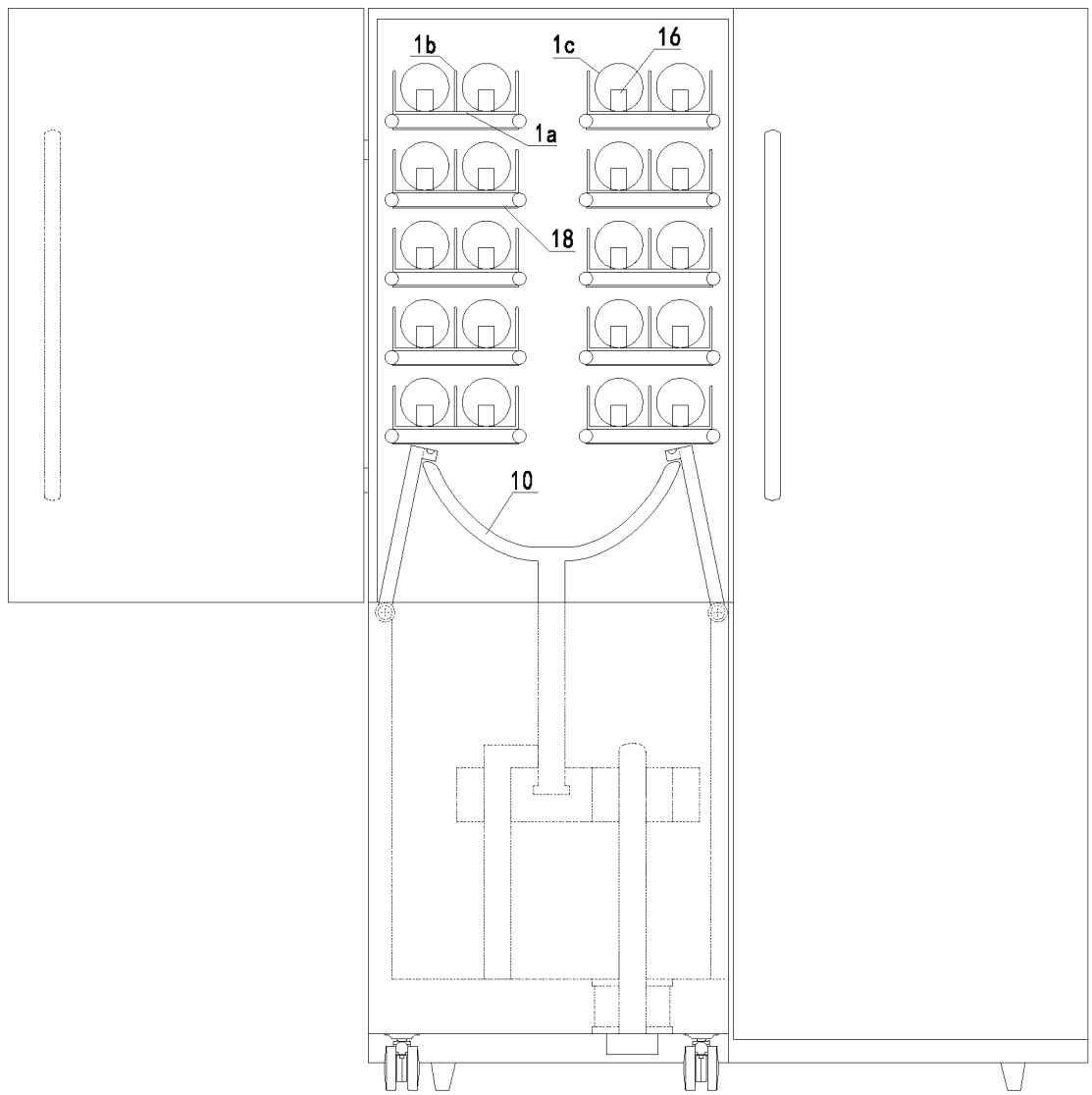
FIG. 3 is a front view of the assembly of the refrigerator and the article delivery device with a refrigerator door opened provided by an embodiment of the present disclosure.

As shown in FIG. 3, a front view of the assembly of the refrigerator and the article delivery device with a refrigerator door opened, the refrigerator 1 is provided with a plurality of article exit devices therein, wherein the article exit devices include first motors 16, supporting plates 1a, partition plates 1b and spiral springs 1c. The plurality of article exit devices are divided into two groups, with the article exit devices in each group fixed in the refrigerator at intervals from bottom to top in parallel, respectively, a passage is reserved between the two groups as an article exit passage, and the partition plate 1b is configured on the supporting plate 1a to form an article lane. Articles are classified and placed on the article lanes, the spiral springs 1c are disposed on the article lanes, with one spiral spring 1c on each article lane correspondingly, and an article is received in a pitch of the spiral spring 1c.

Figure 4:
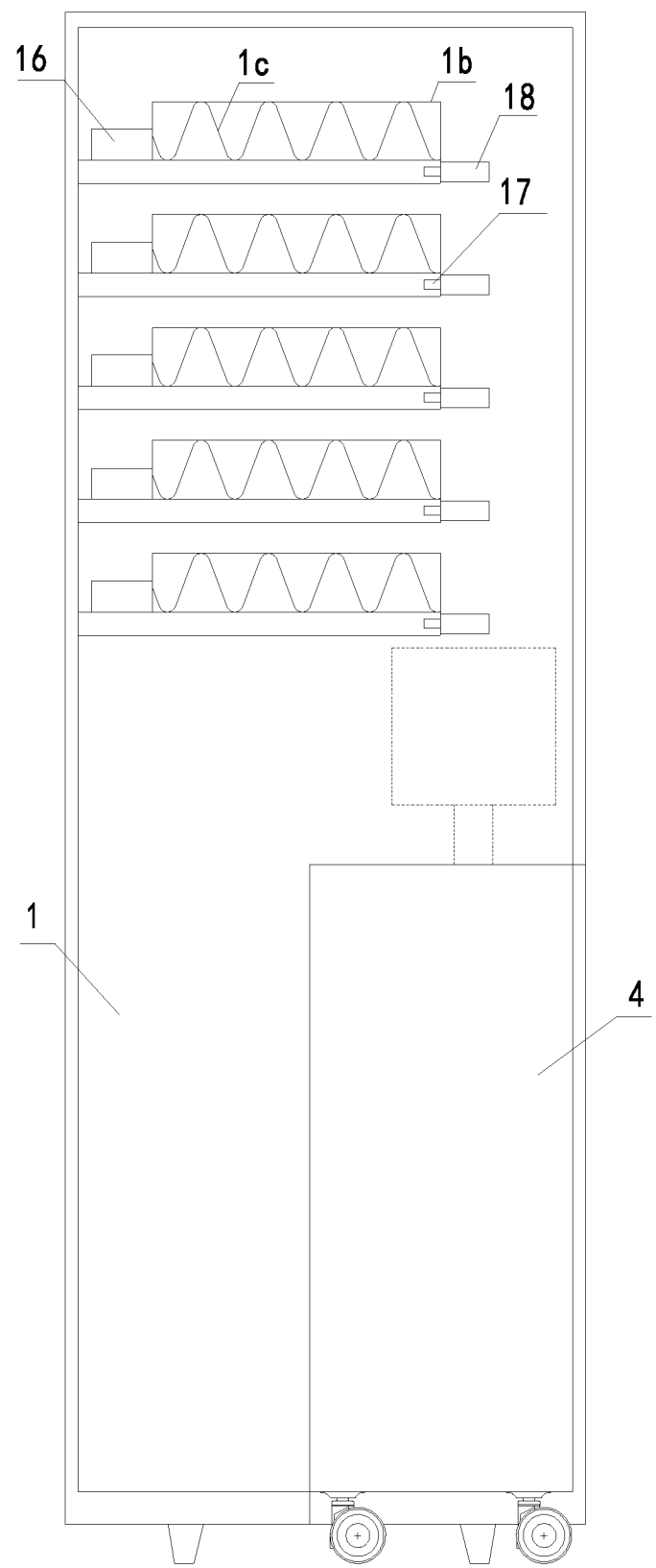
FIG. 4 is a side view of the assembly of the refrigerator and the article delivery device provided by an embodiment of the present disclosure.

As shown in FIG. 4, which is a side view of the assembly of the refrigerator and the article delivery device, in addition to the first motor 16 of the article delivery device, and the refrigerator 1 is further provided with a plurality of transfer devices therein, the transfer device including a second motor 17 and a transfer belt 18. Each first motor 16 drives the corresponding spiral spring 1c to rotate and pushes the article to move away from the first motor 16, so that the article on the article lane falls onto the transfer belt 18 of the corresponding transfer device, the second motor 17 drives the corresponding transfer belt 18 to rotate to transfer the article to the article exit passage between the two groups of article exit devices; from the article exit passage the article falls into the loading chamber 10 lifted in the article delivery device 4.

Figure 5:
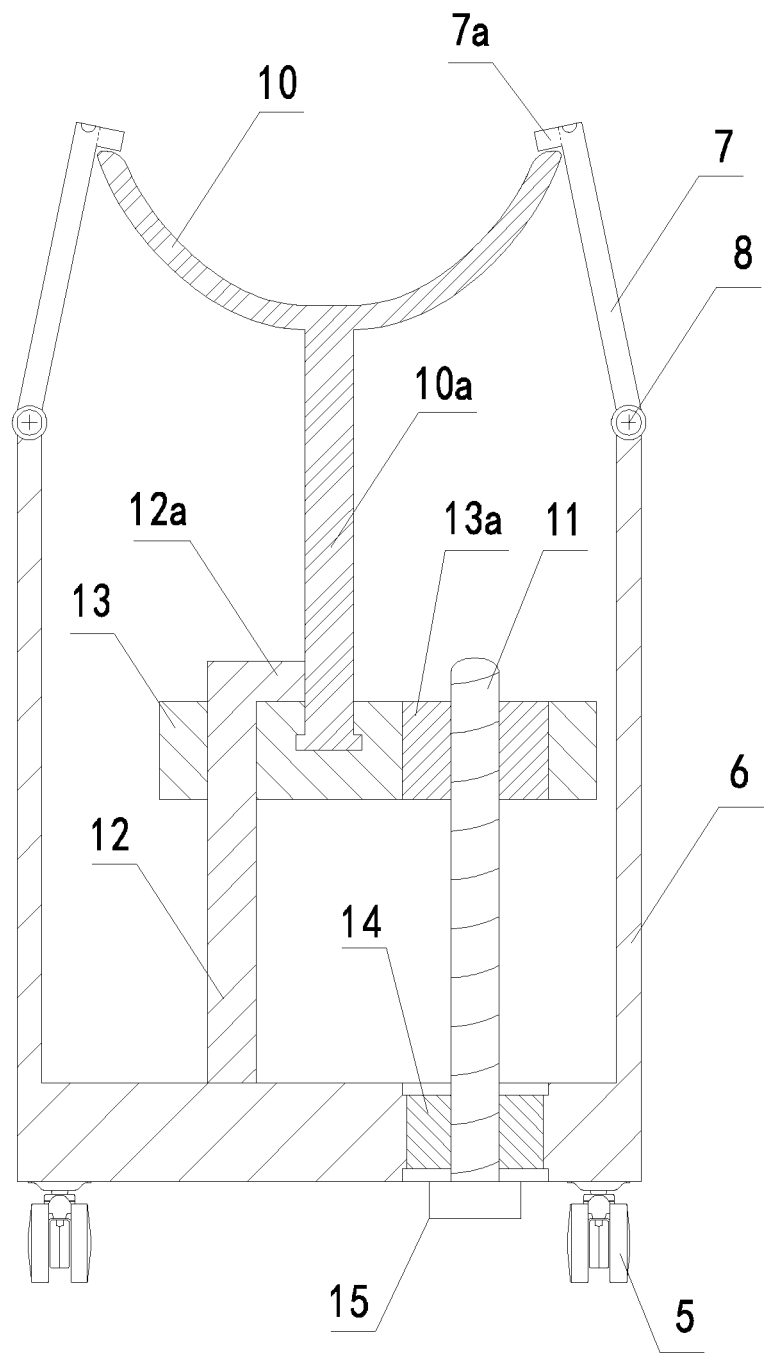
FIG. 5 is a sectional view of the article delivery device with a lid opened provided by an embodiment of the present disclosure.

As shown in FIG. 5, which is a sectional view of the article delivery device with a lid opened, the article delivery device 4 includes running drive wheels 5, a body 6 and a lid 7, wherein the running drive wheels 5 are arranged on a lower surface of a bottom of the body 6, and each running drive wheel 5 is driven by a motor; the lid 7 is rotatably connected with the body 6 through a rotating shaft 8, the lid 7 is in a form of double doors, and a first stopper 7a is provided on the lid 7 and used for limiting a height of the loading chamber 10 when lifted; a lifting device is provided inside the body 6 and includes a lead screw 11, a fixed lever 12, and a movable frame 13, wherein one end of the lead screw 11 is fixed at a bottom of the body 6 through a bearing 14, a stepping motor 15 drives the lead screw 11 to rotate, and the lead screw 11 penetrates through the movable frame 13 by means of a nut 13a; the fixed lever 12 penetrates through the movable frame 13, has one end thereof fixedly connected with the bottom of the body 6, and the other end provided with a second stopper 12a for limiting the height of the movable frame 13 when lifted; a loading chamber lever 10a has one end fixedly connected with the loading chamber 10, and the other end fixed on the movable frame 13.

Figure 6:
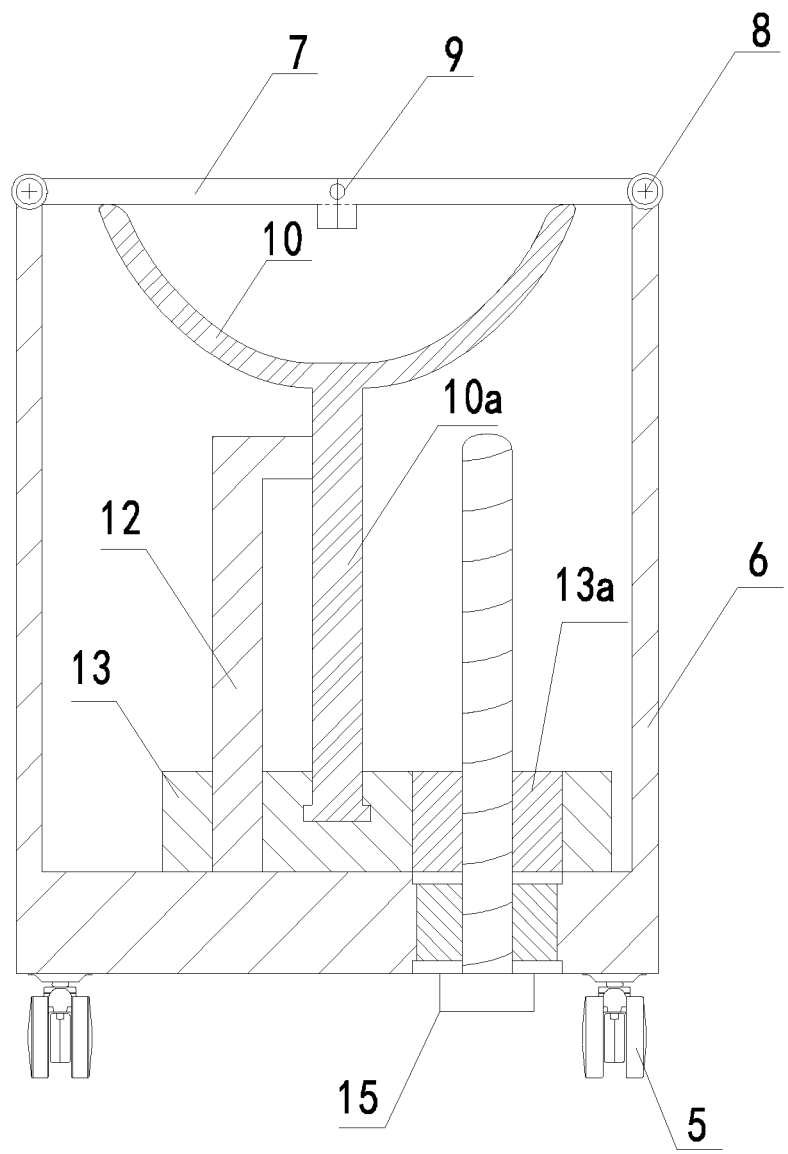
FIG. 6 is a sectional view of the article delivery device with the lid closed provided by an embodiment of the present disclosure.

As shown in FIG. 6, which is a sectional view of the article delivery device with the lid closed, an electronic lock 9 is provided on the lid 7, the loading chamber 10 is lowered with its top within the body 6, and when the lid 7 is closed, the article delivery device is locked with the electronic lock 9.

Optionally, the first motor 16 corresponding to the article exit device is controlled according to the user instruction to drive the corresponding spiral spring 1c to rotate while pushing the article, such as a bottle of mineral water, towards the corresponding transfer belt 18. Moreover, the electronic lock 9 unlocks, the stepping motor 15 reversely rotates, driving the movable frame 13 and the loading chamber lever 10a to move upwards, and in turn lifting the loading chamber 10; when the movable frame 13 is lifted to the second stopper 12a on the fixed lever 12, the top of the loading chamber 10 then abuts against the first stopper 7a of the lid 7, the stepping motor 15 stops rotating reversely, and the loading chamber 10 stops rising. When the bottle of mineral water falls onto the corresponding transfer belt 18, the corresponding second motor 17 drives the transfer belt 18 to rotate, so that the mineral water is transferred to the article exit passage between the two groups of article exit devices, and the bottle of mineral water falls from the article exit passage into the loading chamber 10 lifted in the article delivery device 4.

Optionally, it is found that, after rounds of tests, it takes 2 seconds to lift the loading chamber and 5 seconds to transfer the article to the loading chamber.

Optionally, after the loading chamber 10 receives the bottle of mineral water, the stepping motor 15 is controlled to operate, driving the movable frame 13 and the loading chamber lever 10a to move, thereby lowering the loading chamber 10; when the movable frame 13 is lowered to the bottom of the body 6, the stepping motor 15 stops operating, the loading chamber 10 is then lowered into the body 6, the lid 7 is closed, the electronic lock 9 locks, and the article delivery device is closed.

Optionally, when the article delivery device 4 receives the bottle of mineral water and closes, the article delivery device is controlled to move to the set target position, such as a sofa; when the article delivery device 4 reaches the target position, the electronic lock 9 unlocks, the stepping motor 15 reversely rotates, driving the movable frame 13 and the loading chamber lever 10a, thereby lifting the loading chamber 10; when the movable frame 13 is lifted to the second stopper 12a on the fixed lever 12, the top of the loading chamber 10 abuts against the first stopper 7a on the lid 7, the loading chamber 10 stops rising, and the bottle of mineral water is offered to the user. After the bottle of mineral water is taken by the user, or in a set time, for example, 10 minutes, the stepping motor 15 is controlled to operate, driving the movable frame 13 and the loading chamber lever 10a to move, thereby lowering the loading chamber 10; when the movable frame 13 is lowered to the bottom of the body 6, the loading chamber 10 is then lowered into the body 6, the stepping motor 15 stops operating, the lid 7 is closed, the electronic lock 9 locks, and the article delivery device is closed. After all these, the article delivery device is controlled to return to the starting position, that is, the bottom of the refrigerator. Therefore, the refrigerator can control the article exit device to move the article to the article delivery device according to the user instruction and then move the article to the set target position, fetching the article to the user automatically without any further user instructions, hence the refrigerator is provided with an additional feature and functions more intelligently, and the user experience is improved.

Optionally, a photoelectric switch is provided in the loading chamber 10, by means of which whether the article is received in or removed from the loading chamber is detected.

In some embodiments, a pressure sensor is provided within the loading chamber 10 by which a change in pressure value is detected to determine whether the article is received or removed. When the pressure value gets larger, it is determined that the article is received, and when the pressure value gets smaller, it is determined that the article is removed.

Optionally, the article delivery device is provided with the running drive wheels and a driving motor, so that the article delivery device can move on a plane; camera devices are provided on its front and side surfaces of the article delivery device, and a road condition is acquired in real time by collecting and identifying images; if obstacles such as steps are in the way, the controller controls the article delivery device to turn or stop running, to avoid collision or falling; besides, a radar ultrasonic sensor is also provided and used for detecting a distance between the article delivery device and a surrounding object when the article delivery device moves; a photoelectric coding disc is provided on the running drive wheel of the article delivery device, so that a wheel speed can be detected and controlled for positioning and path planning.

According to the method for controlling an article delivery device of a refrigerator in the above embodiment, the article delivery device can be powered sufficiently to move to the target position, which ensures a complete and normal delivery and avoids a situation where the article delivery device cannot reach the target position or cannot return to a starting position due to low power, thereby improving the user experience.

Figure 7:
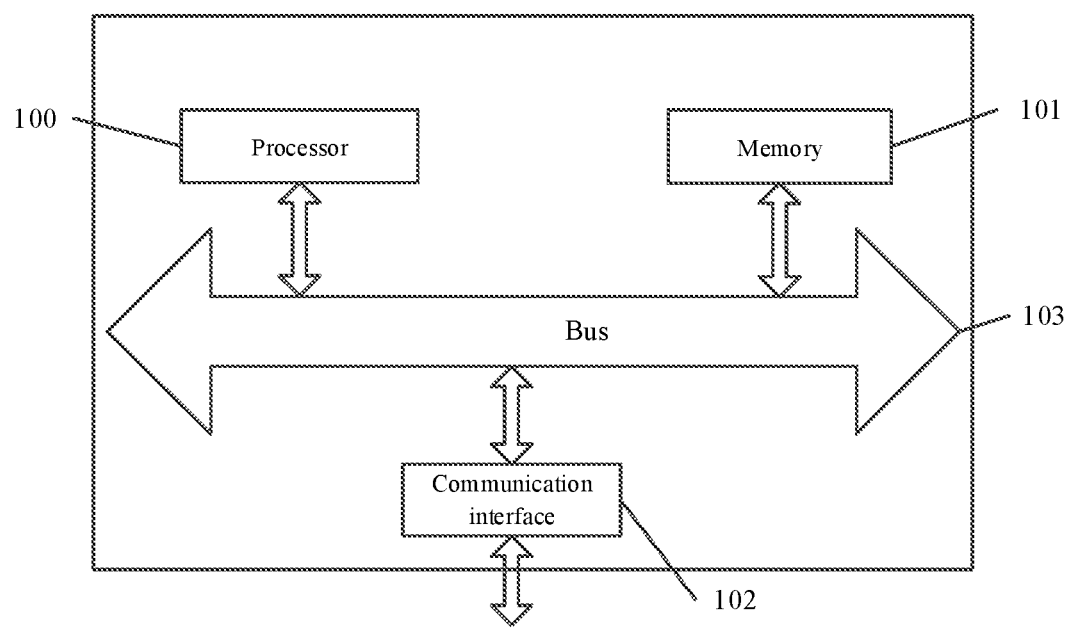
FIG. 7 is a schematic view of an apparatus for controlling an article delivery device of a refrigerator provided by an embodiment of the present disclosure.

An embodiment of the present disclosure provides an apparatus for controlling an article delivery device of a refrigerator structured as shown in FIG. 7, including a processor 100 and a memory 101 storing program instructions, as well as a communication interface 102 and a bus 103, wherein the processor 100, the communication interface 102, and the memory 101 may communicate with each other via the bus 103. The communication interface 102 may be used for information transfer. The processor 100 may invoke program instructions in the memory 101, and the processor is configured to perform the method for controlling an article delivery device of a refrigerator according to the above-described embodiments when executing the program instructions.

Further, the aforementioned logic instructions in the memory 101 may be stored in a computer-readable storage medium when implemented in the form of software functional units and sold or used as an independent product.

The memory 101 serves as a computer-readable storage medium for storing software programs and computer-executable programs such as program instructions/modules corresponding to the method in the disclosed embodiments. The processor 100 executes functional applications and processes data by running software programs, instructions and modules stored in the memory 101, i.e., implementing the method for controlling an article delivery device of a refrigerator described in the above embodiments.

The memory 101 may include a storage program partition and a storage data partition, wherein the storage program partition may store an operating system and an application program required for at least one function; the storage data partition may store data or the like created according to the use of the terminal device. Besides, the memory 101 may include a high-speed random access memory, and may also include a non-volatile memory.

According to the apparatus for controlling an article delivery device of a refrigerator in the above embodiment, the article delivery device can be powered sufficiently to move to the target position, which ensures a complete and normal delivery and avoids a situation where the article delivery device cannot reach the target position or cannot return to a starting position due to low power, thereby improving the user experience.

An embodiment of the present disclosure provides a refrigerator including the apparatus for controlling an article delivery device of a refrigerator. According to the refrigerator, the article delivery device can be powered sufficiently to move to the target position, which ensures a complete and normal delivery and avoids a situation where the article delivery device cannot reach the target position or cannot return to a starting position due to low power, thereby improving the user experience.

An embodiment of the present disclosure provides a computer-readable storage medium storing computer-executable instructions configured to perform the above-described method for controlling an article delivery device of a refrigerator.

An embodiment of the present disclosure provides a computer program product including a computer program stored on a computer-readable storage medium, the computer program including program instructions executable by a computer to cause the computer to perform the above-described method for controlling an article delivery device of a refrigerator.

The computer-readable storage medium may be a transient computer-readable storage medium or a non-transient computer-readable storage medium.

The aspects of the disclosed embodiments may be embodied in the form of a software product stored in a storage medium including one or more instructions for causing a computer device, which may be a personal computer, a server, or a network device, etc., to perform all or part of the steps of the method described in the embodiments of the present disclosure. The storage medium can be a non-transient storage medium, including a variety of media capable of storing program codes, such as a USB flash disk, a mobile hard disk drive, a read-only memory (ROM), a random access memory (RAM), or a magnetic or optical disk; alternatively, the storage medium can be transient storage media.

The foregoing description and drawings illustrate embodiments of the present disclosure sufficiently to enable those skilled in the art to practice them. Other embodiments may include structural, logical, electrical, procedural, and other variations. These embodiments merely represent possible variations. Individual components and functions are optional unless explicitly required otherwise, and the order of operation may vary. Portions and features of some embodiments may be included in other embodiments or replace those of other embodiments. The scope of the embodiments of the present disclosure includes the entire scope of the claims, and all available equivalents thereof. As used herein, although the terms "first", "second", and the like may describe various elements, these elements should not be limited by these terms. These terms are only used to distinguish one element from another. For example, a first element may be referred to as a second element without changing the meaning of the description, and likewise, a second element may be referred to as a first element, so long as all occurrences of the "first element" are consistently renamed and all occurrences of the "second element" are consistently renamed. The first element and the second element are both elements, but may not be identical elements. Also, the wording herein is used for describing the embodiments only and is not intended to limit the claims. As used in the embodiments and the claims, the singular forms of "a", "an", and "the" are intended to include the plural forms as well, unless it's clearly indicated otherwise. Similarly, the term "and/or" as used herein is meant to encompass any and all possible combinations of one or more of the associated lists. Additionally, the terms "comprise", and variations thereof, i.e., "comprises" and/or "comprising", when used herein, refer to the presence of stated features, integers, steps, operations, elements, and/or components, but do not preclude presence or addition of one or more other features, integers, steps, operations, elements, components and/or groups. An element defined by the phrase "includes a . . . " does not, without more constraints, preclude the existence of additional identical elements in the process, method, or device that includes the element. Herein, it is noted that each embodiment differs from another embodiment in their emphases, and they share something in common as the reference for each other. For the method, the product, and the like disclosed in the embodiments, if they correspond to the method disclosed in the embodiments, reference may be made to the corresponding description of the method.

Those skilled in the art will appreciate that the various illustrative units and algorithm steps described in connection with the embodiments disclosed herein may be implemented as electronic hardware, or combinations of computer software and electronic hardware. Whether such functionality is implemented as hardware or software depends upon the particular application and design constraints imposed on the particular implementation. Those skilled in the art may implement the described functionality in varying ways for each particular application, but such an implementation should not be interpreted as causing a departure from the scope of the disclosed embodiments. It will be apparent to those skilled in the art that, for convenience and brevity of description, reference may be made to corresponding processes in the foregoing method embodiments for specific operation of the system, apparatus and unit described above, which will not be described in detail herein.

In the embodiments disclosed herein, the disclosed method, article of manufacture (including, but not limited to, apparatus, device, etc.) may be implemented otherwise. For example, the apparatus embodiments described above are merely illustrative, e.g., the partitioning of unit may be only based on the logical function, and additional ways of partitioning may be possible in an actual implementation, doe example, multiple units or components may be combined or integrated into another system, or some features may be omitted or not performed. Besides, the couplings or direct couplings or communicative connections shown or discussed with respect to one another may be indirect couplings or communicative connections through some interface, device or unit, and may be electrical, mechanical or otherwise. The units described as separate components may or may not be physically separate, and the components shown as units may or may not be physical units, in other words, they may have a single location, or may be a plenty of units distributed over a network. Some or all of the units may be selected as necessary to implement the embodiments herein. Moreover, the functional units in the embodiments of the present disclosure may be integrated in one processing unit, may be separate physical units, or may be integrated in one unit with two or more units.

The flowcharts and block diagrams in the drawings illustrate the architecture, functionality, and operation of possible implementations of the system, method, and computer program product in accordance with embodiments of the present disclosure. In this regard, each block in the flowchart or block diagram may represent a module, a segment, or a portion of codes, which includes one or more executable instructions for implementing the specified logical function (s). In some alternative implementations, the functions noted in the blocks may take place in a different order from that noted in the drawings. For example, two successive blocks may in fact be executed substantially in parallel, and they may sometimes be executed in the reverse order, depending upon the functionality involved. In the description of the flowcharts and block diagrams in the drawings, the operations or steps corresponding to different blocks may also occur in a different order from that disclosed in the description, sometimes without a particular order between the different operations or steps. For example, two successive operations or steps may in fact be performed substantially in parallel, and they may sometimes be performed in the reverse order, depending on the functionality involved. Each block of the block diagrams and/or flowcharts, and combinations of blocks in the block diagrams and/or flowcharts, can be implemented by special purpose hardware-based systems which perform the specified functions or acts, or implemented by combinations of special purpose hardware and computer instructions.

What is claimed is:

1. A method for controlling an article delivery device, comprising:
    detecting whether the article delivery device is in a wireless charging area, and charging the article delivery device according to a battery power of the article delivery device;
    controlling the article delivery device to be loaded according to a received user instruction and a target position after the battery power of the article delivery device reaches a set threshold value, and controlling the article delivery device to open according to the user instruction, and controlling the article delivery device to close after detecting that an article enters the article delivery device; and
    controlling the article delivery device to move to a target position after the article delivery device is loaded.

2. The method according to claim 1, further comprising: controlling the article delivery device to open when the article delivery device reaches the target position.

3. The method according to claim 2, further comprising: controlling the article delivery device to close after detecting that the article leaves the article delivery device.

4. The method according to claim 3, after detecting that the article leaves the article delivery device and controlling the article delivery device to close, further comprising:
    controlling the article delivery device to return to a starting position.

5. The method according to claim 4, wherein the target position is obtained by calculating a location beacon address broadcast by a location beacon and a received signal strength indication RSSI.

6. The method according to claim 5, wherein the step of controlling the article delivery device to open comprises:
    lifting a loading chamber of the article delivery device to open the article delivery device.

7. The method according to claim 6, wherein the step of controlling the article delivery device to close comprises:
    lowering the loading chamber of the article delivery device to close the article delivery device.

8. The method according to claim 2, wherein the step of controlling the article delivery device to open comprises:
    lifting a loading chamber of the article delivery device to open the article delivery device.

9. The method according to claim 2, wherein the step of controlling the article delivery device to close comprises:
    lowering a loading chamber of the article delivery device to close the article delivery device.

10. The method according to claim 3, wherein the step of controlling the article delivery device to open comprises:
    lifting a loading chamber of the article delivery device to open the article delivery device.

11. The method according to claim 3, wherein the step of controlling the article delivery device to close comprises:
    lowering a loading chamber of the article delivery device to close the article delivery device.

12. The method according to claim 4, wherein the step of controlling the article delivery device to open comprises:
    lifting a loading chamber of the article delivery device to open the article delivery device.

13. The method according to claim 4, wherein the step of controlling the article delivery device to close comprises:
    lowering a loading chamber of the article delivery device to close the article delivery device.

14. The method according to claim 1, wherein the step of controlling the article delivery device to open comprises:
    lifting a loading chamber of the article delivery device to open the article delivery device.

15. The method according to claim 1, wherein the step of controlling the article delivery device to open comprises:
    lifting a loading chamber of the article delivery device to open the article delivery device.

16. The method according to claim 1, wherein the step of controlling the article delivery device to close comprises:
    lowering a loading chamber of the article delivery device to close the article delivery device.

17. The method according to claim 1, wherein the step of controlling the article delivery device to close comprises:
    lowering a loading chamber of the article delivery device to close the article delivery device.

18. An apparatus for controlling an article delivery device, comprising a processor and a memory storing program instructions, wherein the processor is configured to perform the method for controlling the article delivery device according to claim 1 when executing the program instructions.

19. A refrigerator, comprising the apparatus for controlling the article delivery device according to claim 18.

* * * * *